United States Patent [19]

Mizuno et al.

[11] Patent Number: 4,875,911

[45] Date of Patent: Oct. 24, 1989

[54] APPARATUS FOR SEPARATING GASEOUS MIXTURES

[75] Inventors: Shinji Mizuno, Kani; Humio Kawato, Kasugai; Kazuyoshi Hanazawa, Naoya; Tatsuaki Aoyama, Ichimiya; Yoshinari Ogasawara, Kasugai, all of Japan

[73] Assignee: CKD Kabushiki Kaisha, Aichi, Japan

[21] Appl. No.: 73,956

[22] Filed: Jul. 15, 1987

[30] Foreign Application Priority Data

| Jul. 22, 1986 | [JP] | Japan | 61-172572 |
| May 7, 1987 | [JP] | Japan | 62-111171 |
| May 7, 1987 | [JP] | Japan | 62-111172 |
| May 7, 1987 | [JP] | Japan | 62-68081 |

[51] Int. Cl.⁴ ............................................. B01D 53/04
[52] U.S. Cl. ......................................... 55/162; 55/179; 55/180; 55/387; 55/389
[58] Field of Search ................ 55/31, 33, 35, 161–163, 55/179, 180, 387, 389

[56] References Cited

U.S. PATENT DOCUMENTS

| 2,944,627 | 7/1960 | Skarstrom | 55/179 X |
| 3,279,151 | 10/1966 | Kauer, Jr. et al. | 55/163 X |
| 4,162,146 | 7/1979 | Seibert | 55/179 X |
| 4,468,239 | 8/1984 | Frantz | 55/179 X |
| 4,559,065 | 12/1985 | Null et al. | 55/179 X |

FOREIGN PATENT DOCUMENTS

| 75169 | 7/1978 | Japan | 55/161 |
| 79-001670 | 1/1979 | Japan | 55/180 |

Primary Examiner—Robert Spitzer
Attorney, Agent, or Firm—Ladas & Parry

[57] ABSTRACT

Apparatus for separating gaseous mixtures comprising a pair of separator vessels each packed with adsorbent material such as silica gel, activated alumina or molecular sieves or absorbent material such as lithium chloride with serving as separating material, wherein a separating cycle during which air containing water vapor or gaseous mixture consisting of two or more different components such as nitrogen and oxygen is fed into one of the separator vessels to remove one or more components from the mixture and a regenerating cycle during which the processed gaseous mixture is partially fed into the other separator vessel to remove the quantity of components previously adsorbed or adsorbed by the separating material present within this separator vessel and thereby to regenerate the separating material are alternately repeated and wherein there are provided regeneration promoting separator vessels for further removal of the components to a lower concentration.

3 Claims, 10 Drawing Sheets

APPARATUS FOR SEPARATING GASEOUS MIXTURES

BACKGROUND OF THE INVENTION

1. Field of the Invention

The present invention relates to an apparatus for separating gaseous mixtures comprising a pair of separator vessels each packed with absorbent material such as silica gel, activated alumina or molecular sieves or absorbent material such as lithium chloride both serving as separating material, wherein a separating cycle during which air containing water vapor or gaseous mixture consisting of two or more different components such as nitrogen and oxygen is fed into one of said separator vessels to remove one or more components from the mixture and a regenerating cycle during which the processed gaseous mixture is partially fed into the other separator vessel to remove the quantity of components previously adsorbed or absorbed by the separating material present within this separator vessel and thereby to regenerate the separating material are alternately repeated.

2. Description of the Prior Art

As disclosed in U.S. Pat. No. 2,944,627, such apparatus for separating gaseous mixtures conventionally comprises a pair of main conduits each having an associated main separator vessel packed with adsorbent or absorbent material functioning as separating material are arranged in parallel with each other with inlet sides of the respective main conduits being connected to a common feed port while outlet sides of the respective main conduits being connected to a common discharge port. The main conduits are interconnected on their discharge sides by a bypass conduit including a stationary or variable throttle valve. A pressurized unprocessed gaseous mixture consisting of two or more different components such as air containing water vapor fed through the feed port is introduced alternately into the respective main conduits at predetermined time intervals by operating a plurality of switching valves provided in the respective main conduits so that the separating cycle during which the unprocessed gaseous mixture is fed into one of the main separator vessel to remove one or more components and this processed gaseous mixture is discharged through the discharge port and the regenerating cycle during which the processed gaseous mixture is partially introduced into the bypass conduit, then pressure-reduced through the throttle valve interposed in this bypass conduit and the processed gaseous mixture thus concentration-reduced is introduced into the other main separator vessel so as to remove the quantity of components previously adsorbed or absorbed by the separating material present in this separator vessel and thereby to regenerate the separating material may be alternately repeated to achieve continuous separation of one or more components from the unprocessed gaseous mixture. This apparatus operates on a principle that the adsorbent material such as silica gel or the absorbent material used as the separating material exhibits a unique characteristic of adsorbing or absorbing one or more components contained in the gaseous mixture or releasing them depending upon a relative concentration of the gaseous components to which the separating material is exposed. For example, in the case of dehumidifying gaseous mixture such as air containing water vapor by introducing such gaseous mixture into the separator vessel packed with adsorbent material such as silica gel and by separating said water vapor, the quantity of water vapor contained in the gaseous mixture per unit volume decreases in proportion to a pressure drop of the gaseous mixture as the latter is pressure-reduced and thereby expanded, so that a volume R of the regenerating gas required to release the moisture content previously adsorbed by the adsorbent material from unprocessed gaseous mixture at an absolute pressure $P_1$ and of a volume Q is given by $R = P_2/P_1 \times Q$ where $P_2$ represents an absolute pressure of the regenerating gas. Therefore, $P_2/P_1$ times the volume of the gaseous mixture dehumidified through the separator vessel into which the unprocessed gaseous mixture had been introduced and flowing out through an outlet may be fed into the other separator vessel to effectively dehumidify and thereby to regenerate the adsorbent material in this separator vessel. However, in practice, various factors such as a flow resistance encountered in the conduits, a pressure loss occurring in the separator vessels, a hysteresis of the dehumidifying characteristic of the adsorbent material, a temperature variation appearing in the separator vessels and a pattern of gas flow appearing within the separator vessels prevent the theoretical equation as set forth above from being established. With a consequence, the quatity of the dehumidified gas much more than the volume as defined by said pressure ratio is necessary for effective regeneration of the adsorbent material in the separator vessel on the regeneration side. Thus, an improvement in the efficiency of dehumidifying the unprocessed gaseous mixture has usually been limited to a certain level.

SUMMARY OF THE INVENTION

As a measure to solve the problem of the prior art as has been mentioned above, the present invention provides regeneration promoting separator vessels in the bypass conduit up- and downstream of the throttle valve, respectively, to further reduce the concentration of the components still remaining in the processed gaseous mixture flowing through the bypass conduit. More specifically, the processed gaseous mixture flowing into the bypass conduit after one or more components had been removed through one of the main separator vessels passes through the regeneration promoting separator vessel disposed upstream of the throttle valve, wherein the concentration of the components to be removed is further reduced, and then passes through the throttle means such as a throttle valve or an orifice, wherein a pressure drop and a corresponding expansion further reduce the concentration of said components. The processed gaseous mixture thus pressure-reduced and concentration-lowered now flows into the regeneration promoting separator vessel disposed downstream of the throttle means and, after removing the quantity of components previously adsorbed or absorbed by the separating material in this vessel and thereby regenerating the separating material, flows into the main separator vessel on the regeneration side. A volume R of regenerating gas required to release the moisture content previously adsorbed by the adsorbent packing material in the regeneration promoting separator vessel from the volume Q of gaseous mixture at an absolute pressure $P_1$ is theoretically given by $R = P_2/P_1 \times Q$ where $P_2$ represents an absolute pressure of the regenerating gas. In view of $R = Q$, in practice, the separating material in the regeneration promoting separator vessel disposed downstream of the throttle means is regenerated in a time substantially corresponding to the regeneration time multiplied by $P_2/P_1$ and then the processed gaseous mixture having its concentration further reduced through the throttle means flows directly into the main separator vessel so that plenty of components previously adsorbed or absorbed by the separating material in this main separator vessel can be effectively removed. Accordingly, with the flow rate of the processed gaseous mixture discharged through the discharge port being preset to the same level as in the apparatus of prior art, the concentration of the components which must be removed from but still remains in the processed gaseous mixture can be further lowered. With the concentration of the components which must be removed from but really remains in the processed gaseous mixture being preset to the same level as in apparatus of prior art, the quantity of the regenerating gas can be decreased while the flow rate of the processed gaseous mixture discharged through the discharge port can be increased.

DESCRIPTION OF THE PREFERRED EMBODIMENT:

The invention will be described in reference with the accompanying drawing, first by way of first and second embodiments in the form of a dehumidifier adapted to remove water vapor in air.

Figure 1:
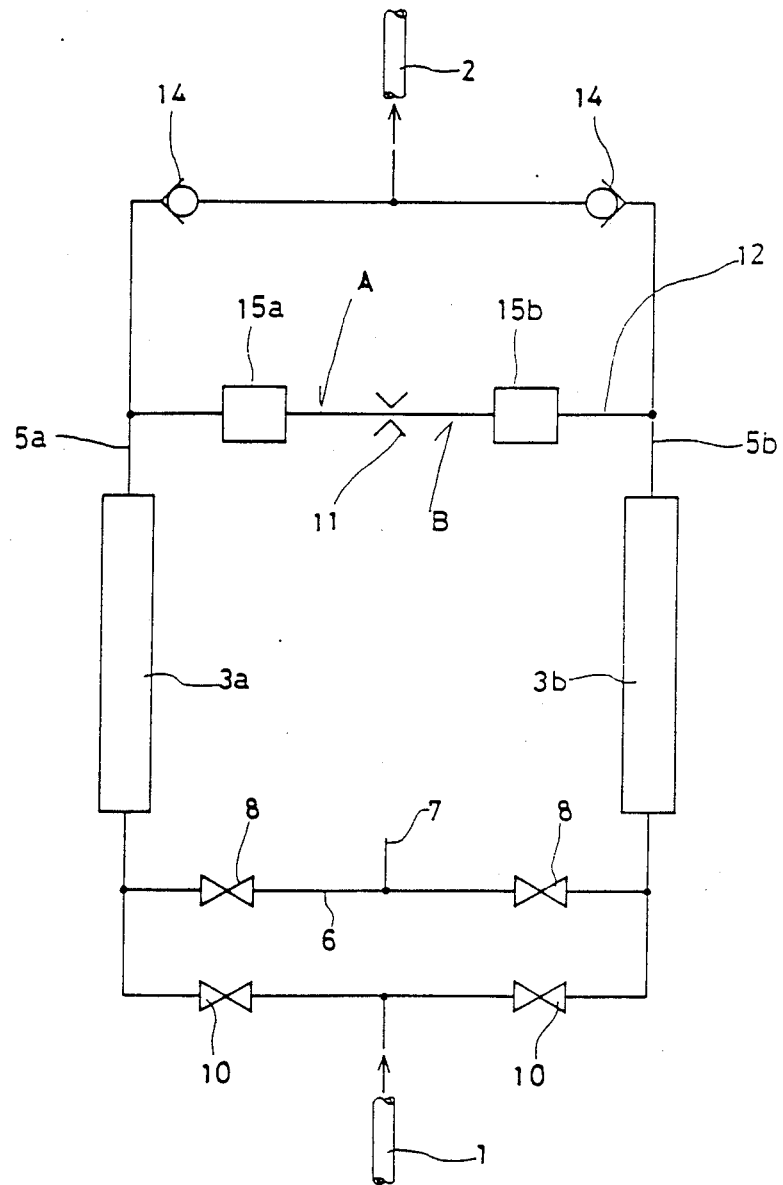
FIG. 1 is a pneumatic circuit diagram in the first embodiment of the invention.

FIG. 1 illustrates the first embodiment comprising a pair of main conduits 5a, 5b each having a main separator vessel 3a, 3b interposed therein and packed with suitable adsorbent material such as silica gel are connected in parallel with each other between a feed conduit 1 for unprocessed gaseous mixture containing water vapor and a discharge conduit 2 for dehumidified gaseous mixture. The respective main conduits 5a, 5b are interconnected at points along the respective sections thereof extending from the feed conduit 1 to the respective main separator vessels 3a, 3b by a connecting conduit 6 which has, in turn, an outlet 7 at a middle point therealong and switching valves 8, 8 adjacent the points at which the conduit 6 is connected to the respective main conduits 5a, 5b. There are provided switching valves 10, 10 also in the sections of the respective main conduits 5a, 5b extending from the feed conduit 1 to said connection points. The respective main conduits 5a, 5b are interconnected also at points along the sections thereof extending from the associated main separator vessels 3a, 3b to the discharge conduit 2 by a bypass conduit 12 having a throttle valve 11 interposed therein at a middle point. There are provided check valves 14, 14 in the sections of the respective main conduits 5a, 5b extending from the points at which the bypass conduit 12 is connected to the respective main conduits 5a, 5b to the discharge conduit 2. Assumed that the switching valve 10 shown at the left hand (i.e., associated with the main conduit 5a) is opened while the switching valve 10 shown at the right hand (i.e., associated with the main conduit 5b) is closed and the switching valve 8 shown at the left hand is closed while the switching valve 8 shown at the right hand is opened, unprocessed air fed through the feed conduit 1 passes through the left-hand main separator vessel 3a, in which water vapor is removed, then forcibly opens the left-hand check valve 14 to be discharged through the discharge conduit 2 while the air stream dehumidified through said main separator vessel 3a partially flows into the bypass conduit 12, passes through the throttle valve 11, in which the air stream is further pressure-reduced and further dehumidified, then passes through the right-hand main separator vessel 3b, dehumidifying and thereby regenerating the adsorbent material in this main separator vessel 3b, and thereafter is output through the outlet 7 provided at the middle point along the connecting conduit 6. Now assumed that the switching valves 8, 10 take the reverse conditions with respect to those as have been assumed above, the unprocessed air stream passes through the right-hand main separator vessel 3b, in which the air stream is dehumidified before discharged through the discharge conduit 2 while the air stream thus dehumidified through the main separator vessel 3b partially flows into the bypass conduit 12, passes through the throttle valve 11, in which this partial air stream is further pressure-reduced and further dehumidified, then passes through the left-hand main separator vessel 3a, dehumifying and thereby regenerating the adsorbent material present therein, and thereafter is output through the outlet 7 provided in the connecting conduit 6. Thus, by operating the switching valves 8, 10 at predetermined time intervals, it is achieved that, while one of the main separator vessel is dehumidifying the unprocessed air stream, the quantity of the air stream which has been dehumidified through said one main separator vessel passes through the other main separator vessel, dehumidifying and thereby regenerating the adsorbent material in this main separator vessel. By operating the switching valves 8, 10 at predetermined time intervals in this manner, the unprocessed air stream containing water vapor can be continuously dehumidified.

Although the features as have been described hereinabove are similar to those of the well known apparatus, the present embodiment of the invention further comprises, in the bypass conduit 12, regeneration promoting separator vessels 15a, 15b up- and downstream of the throttle valve 11, respectively, and these vessels 15a, 15b are also packed with suitable adsorbent material just as the main separator vessels 3a, 3b.

With such arrangement, the quantity of air stream dehumidified through the main separator vessel 3a is further dehumidified through the regeneration promoting separator vessel 15a disposed upstream of the throttle valve 11 before passing said throttle valve 11 in which said quantity of air stream is further pressure-reduced and dehumidified, then flows into the regeneration promoting separator vessel 15b disposed downstream of said throttle valve 11, regenerating the adsorbent material in this separator vessel 15b, and flows into the main separator vessel 3b which is on the regeneration side at this cycle. A volume R of the absorbent material regenerating gas required for dehumidifying the moisture adsorbed by the adsorbent material in the regeneration promoting separator vessel 15b from a volume Q of air at an absolute pressure $P_1$ is theoretically given by an equation $R = P_2/P_1 \times Q$ where $P_2$ represents an absolute pressure of the regenerating gas. In view of $R = Q$, the adsorbent material in the regeneration promoting separator vessel 15b disposed downstream of the throttle valve 11 is dehumidified and regenerated in a short time, then dehumidified air has its humidity significantly reduced, as has passed through the throttle valve 11, directly flows into the main separator vessel 3b which is on the regeneration side on this cycle, so that the adsorbent material in the main separator vessel 3b is also significantly dehumidified and thereby regenerated.

With this embodiment, the switching valves 8, 10 were operated every 2 minutes, activated alumina was used as the adsorbent material for the main separator vessel and molecular sieves were used as the adsorbent material for the regeneration promoting separator vessels. An unprocessed air stream containing water of 46.1 g/m$^3$ was fed at a flow rate of 2 m/$^3$/min under an absolute pressure of 8 atmospheric pressure at a temperature of 38° C. and a dehumidified air stream was discharged through the discharge conduit 2 at a flow rate of 1.64 m$^3$/min. It was then found that the moisture content in the dehumidified air stream per 1 m$^3$ discharged through the discharge conduit 2 was drastically reduced to a level as low as 0.043 g in contrast with 0.083 g in the conventional apparatus without the regeneration promoting separator vessels 15a, 15b even when the same volume per 1 min was discharged through the discharge conduit 2 per 1 min. To verify the function of said regeneration promoting separator vessels 15a, 15b, a flow rate and a moisture content were measured at different points along the conduit 12 and it was determined that, when the left-hand main separator vessel 3a was functioning as the dehumidifier, the moisture content of the dehumidified air stream at a point A along the bypass conduit 12 was 0.013 g/m$^3$ and accordingly the moisture content of the dehumidified air stream at a point B was 0.013 (g/m$^3$)×1.033 (kg f/cm$^2$)/8.033 (kg f/cm$^2$)=0.00167 (g/m$^3$). The air stream thus significantly dehumidified then passes through the regeneration promoting separator vessel 15b disposed downstream of the throttle valve 11 while regenerating the adsorbent material therein and flows into the main separator vessel 3b on the regeneration side in this cycle. A flow rate of the dehumidified air stream required to dehumidify and thereby to regenerate the adsorbent material in this downstream regeneration promoting separator vessel 15b is 0.36 (m$^3$/min)×1.033 (kg f/cm$^2$)×8,033 (kg f/cm$^2$)=0.046 (m$^3$/min) for 0.36 m$^3$/min, the flow rate of the dehumidified air stream flowing into the bypass conduit 12. Really, the air stream flows for 2 minutes at the flow rate of 0.36 m$^3$/min, so that the adsorbent material in the regeneration promoting separator vessel 15b is effectively regenerated in 0.046 (m$^3$/min)/0.36 (m$^3$/min)×2 (min)=0.26 (min). During the remaining 1.74 min, said significantly dehumidified air stream flows into the main separator vessel 3b on the regeneration side in this cycle and thus it was verified that the adsorbent material in this main separator vessel 3b had been effectively dehumidified.

Although activated alumina was used as the absorbent material in the respective main separator vessels and molecular sieves were used as the adsorbent material in the respective regeneration promoting separator vessels in this embodiment, it should be understood that the absorbent material is not limited to these but various types of adsorbent or absorbent material may be used for these vessels.

In the experiment as has been mentioned above, the flow rate of the dehumidified air stream discharged through the discharge conduit 2 was set to the same level as in the apparatus of prior art. As will be obviously understood, if the humidity of the dehumidified air stream to be obtained is set to the same level as in the apparatus of prior art, the flow rate of the dehumidified air stream discharged through the discharge conduit can be increased, since it is possible to reduce the flow rate of the dehumidified air stream to be introduced into the main separator vessel on the regeneration side.

Figure 2:
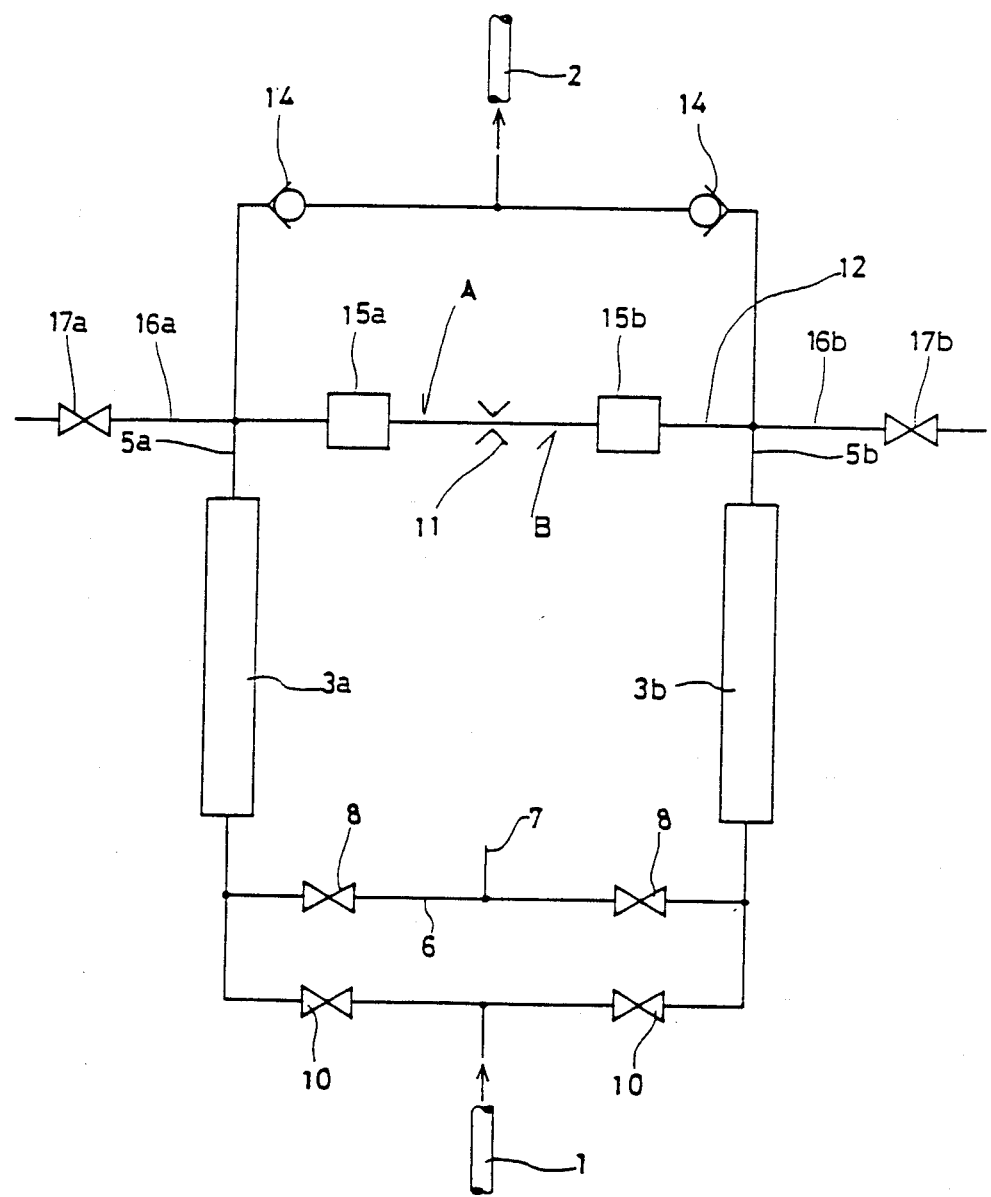
FIG. 2 is a pneumatic circuit diagram in the second embodiment of the invention.

FIG. 2 illustrates the second embodiment of the invention which is identical to the first embodiment except that there are provided a pair of branch conduits 16a, 16b connected to the points at which the bypass conduit 12 is connected to the pair of main conduits 5a, 5b, respectively. The respective branch conduits 16a, 16b include switching valves 17a, 17b and communicate with atmosphere. Both the switching valves 17a, 17b are normally closed and, upon change-over of the main separator vessels 3a, 3b between the dehumidification side and the regeneration side by operating the respective switching valves 8, 10, the switching valve 17a (or 17b) associated with the main separator vessel 3a (or 3b) which has been changed over to the regeneration side is opened so that the regenerating air stream which has regenerated the absorbent material in the regeneration promoting separator vessel 15a (or 15b) downstream of the throttle valve 11 and as a result has obtained a plenty of moisture is exhausted into atmosphere. In this manner, said regenerating air stream is prevented from flowing into the main separator vessel 3a (or 3b) of the regeneration side. When the regeneration of the absorbent packing material in said regeneration promoting separator vessel 15a (15b) has been completed and thereby the dew point of the regenerating air has been adequately lowered, said switching valve 17a (or 17b) is closed again, allowing said regenerating air to flow into the main separator vessel 3a (or 3b). With a consequence, only the regenerating air of a low dew point flows into the main separator vessel 3a (or 3b) and thereby the efficiency for regenerating the adsorbent material therein can be advantageously improved. It was determined from the experiment conducted on the first embodiment that the time taken for regenerating the adsorbent material in the regeneration promoting separator vessel 15a, 15b is 0.26 minutes and, therefore, the switching valve 17a (or 17b) on the regeneration side may be opened for 0.26 minutes from the moment of changing over the main separator vessels 3a, 3b.

Figure 3:
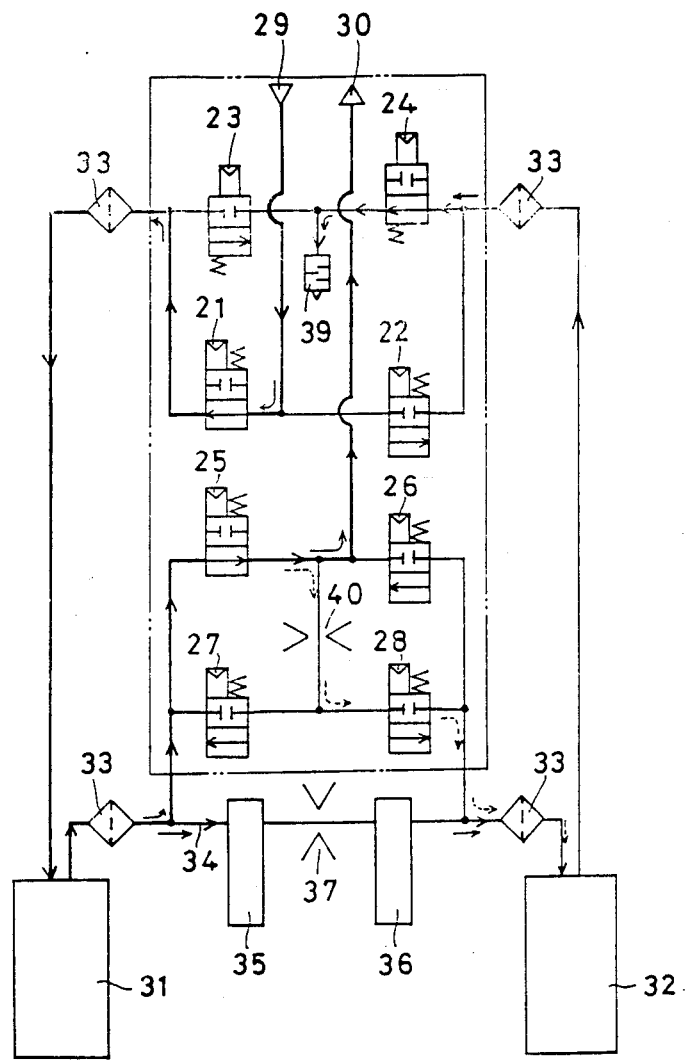
FIGS. 3 and 4 are pneumatic circuit diagrams in the third embodiment of the invention, indicating gas flows with arrows.
Figure 4:
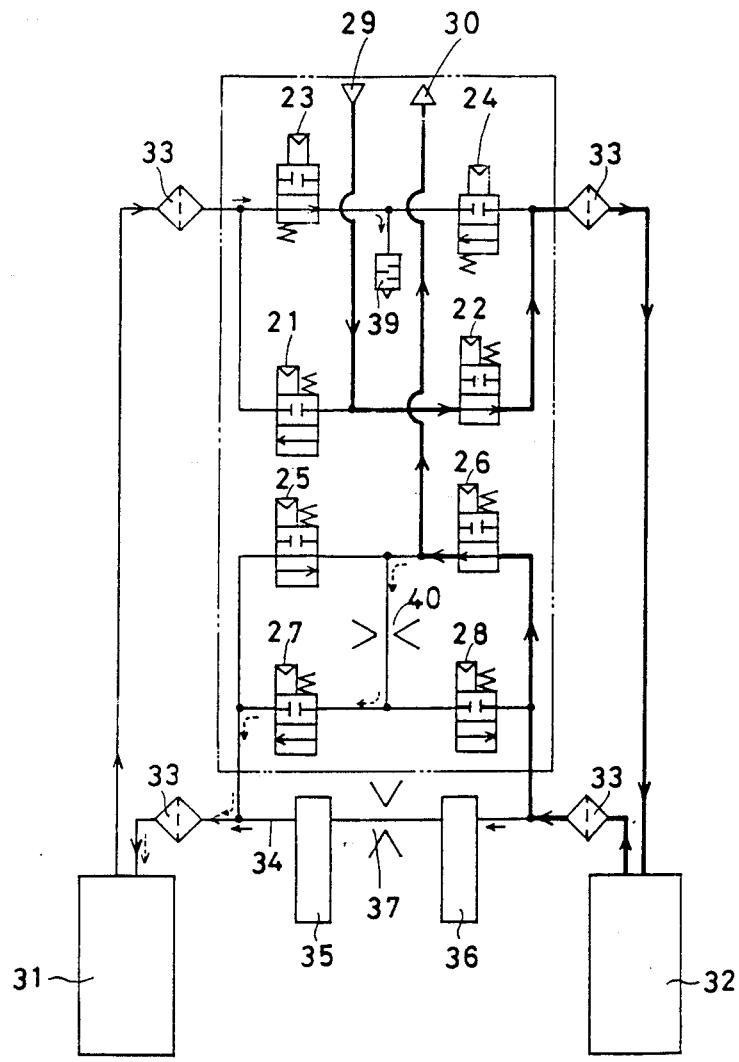

Now the third embodiment of the invention as applied to a dehumidifier will be described in reference with FIGS. 3 through 9. To begin the explanation, a system of this dehumidifier will be considered with reference with FIGS. 3 and 4. When the apparatus is so set that, of totally eight switching valves 21 through 28 in four laterally arranged pairs, the first, fourth and fifth switching valves 21, 24, 25 are opened while the second, third and sixth switching valves 22, 23, 26 are closed, leaving the seventh and eighth switching valves 27, 28 closed, as seen in FIG. 3, unprocessed gaseous mixture at a high pressure fed through a feed port 29, as indicated by a thick solid line, passes through the first switching valves 21, then flows via a filter 33 into a left-hand first separator vessel 31 packed with adsorbent material a such as silica gel. The gaseous mixture having its water vapor component adsorbed by the adsorbent material a and thereby dehumidified passes through another filter 33, then through the fifth switching valve 25 and is discharged through a discharge port 30. The gaseous mixture which has been thus dehumidified partially flows, after leaving the filter 33 downstream of the first separator vessel 31, into a bypass conduit 34, then, as indicated by a thin solid line, passes through a first regeneration promoting separator vessel 35 also packed with adsorbent material a in which the gaseous mixture is further dehumidified and is further pressure-reduced and has its humidity substantially lowered by passing through a throttle valve 37. The gaseous mixture processed in this manner then flows into a second regeneration promoting separator vessel 36, removing the moisture from and thereby regenerating the adsorbent material a therein and, after passing through still another filter 33, flows into a right-hand second separator vessel 32 which is also packed with adsorbent material a. Also in this separator vessel 32, the processed gaseous mixture removes the moisture from the adsorbent material a therein, since the processed gaseous mixture is maintained at a low himidity even after having left the second regeneration promoting separator vessel 36. The gaseous mixture which has completed the regenerating function passes through further another filter 33, then the fourth switching valve 24 and is finally exhausted through an outlet 39. Prior to operation of the first through sixth switching valves 21 through 26 occurring after a predetermined time period has elapsed, the fourth switching valve 24 is closed while the eighth switching valve 28 is opened so that a part of the dehumidified gaseous mixture having passed through the fifth switching valve 25 passes through a throttle valve 40 together with the regenerating gaseous mixture having left the regeneration promoting separator vessels 35, 36, then passes through the eighth switching valve 28 and then flows into the second separator vessel 32, as indicated by broken-lined arrows, resulting in rapidly increasing a pressure therein until the second separator vessel 32 is in a pressure-equilibrium with the first separator vessel 31. Thereupon, the eighth switching valve 28 is closed while the conditions of the first through sixth switching valves 21 through 26 are reversed with respect to the previous conditions, as seen in FIG. 4, so that, as indicated by a thick solid line in FIG. 4, the unprocessed gaseous mixture flows through the second switching valve 22 into the second separator vessel 32 and, after having been dehumidified therein, passes through the sixth switching valve 26 and is discharged through the discharge port 30 which is free from any sudden pressure drop while, as indicated by a thin solid line, the dehumidified gaseous mixture is partially introduced into the bypass conduit 34 in the direction opposite to that as shown in FIG. 3, further dehumidified in the second regeneration promoting separator vessel 36, then has its humidity substantially lowered by passing through the throttle valve 37, and, after having regenerated the adsorbent material a in the first regeneration promoting separator vessel 35, flows into the first separator vessel 31 to regenerate the adsorbent material a therein, then passes through the third switching valve 23 and is exhausted through the outlet 39. When the third switching valve 23 is closed while the seventh switching valve 27 is opened before the first through sixth switching valves 21 through 26 is operated again, a part of the dehumidified gaseous mixture having left the sixth switching valve 26 flows together with the regenerating gaseous mixture having passed through the regeneration promoting separator vessels 36, 35 into the first separator vessel 31 via the throttle valve 40 to rapidly increase a pressure therein until a pressure-equilibrium is established between the first separator vessel 31 and the second separator vessel 32, upon which the seventh switching valve 27 is closed and the first through sixth switching valves 21 through 26 are operated so as to repeat the operation as has been mentioned in connection with FIG. 3. By operating the first through eighth switching valves 21 through 28 at predetermined time intervals, the unprocessed gaseous mixture is dehumidified through the one separator vessel 31 or 32 while the adsorbent material a in the other separator vessel 32 or 31 is regenerated and by closing the third or fourth switching valves 23, 24 while opening the seventh or eighth switching valve 27, 28 immediately before the changing-over operation, the pressure-equilibrium is rapidly established between the first separator vessel 31 and the second separator vessel 32 to minimize a variation possibly occurring in the pressure of the dehumidified gaseous mixture discharged through the discharge port 30 during the changing-over operation.

Figure 5:
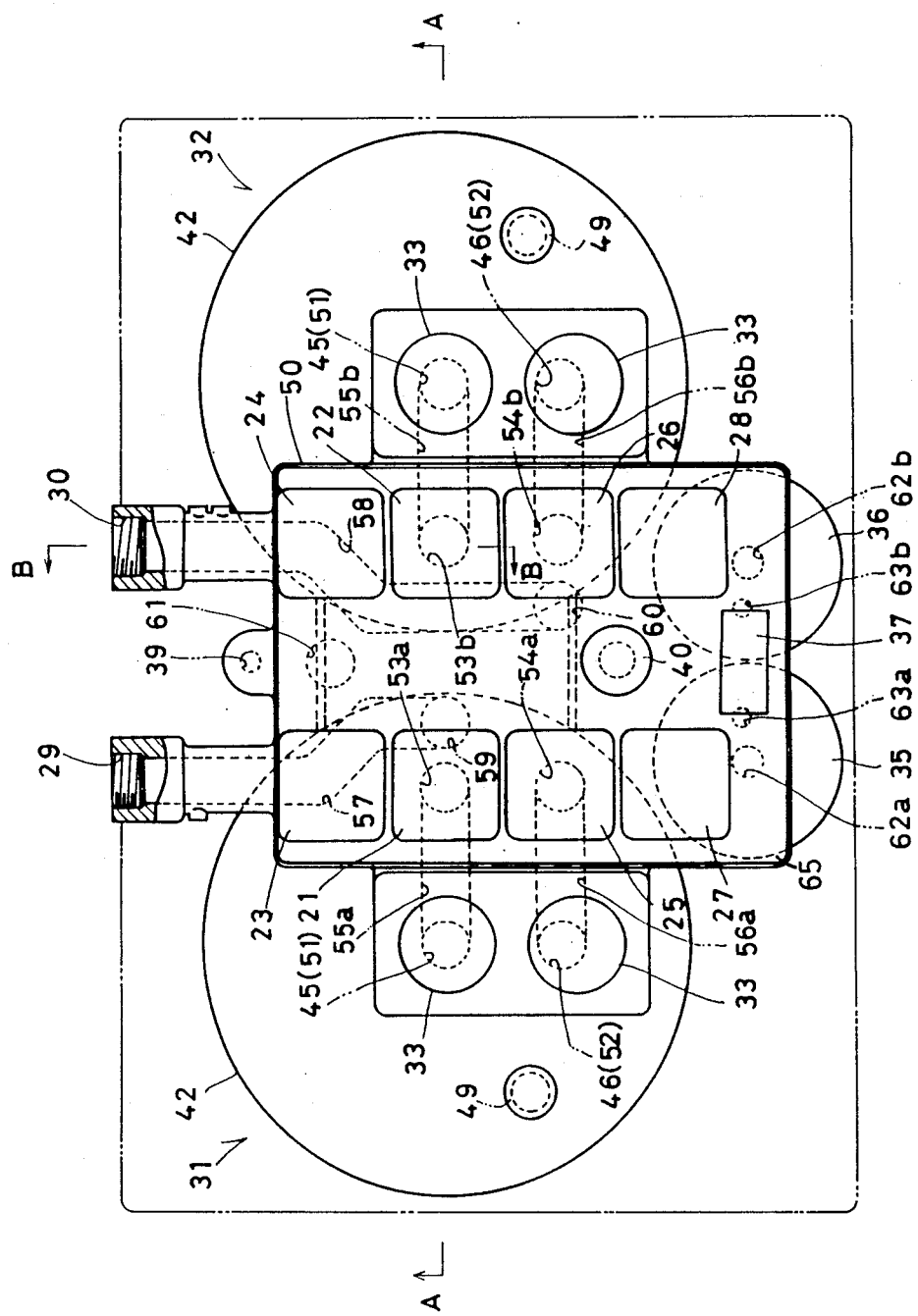
FIG. 5 is a plan view showing, as partially broken away, the third embodiment.
Figure 6:
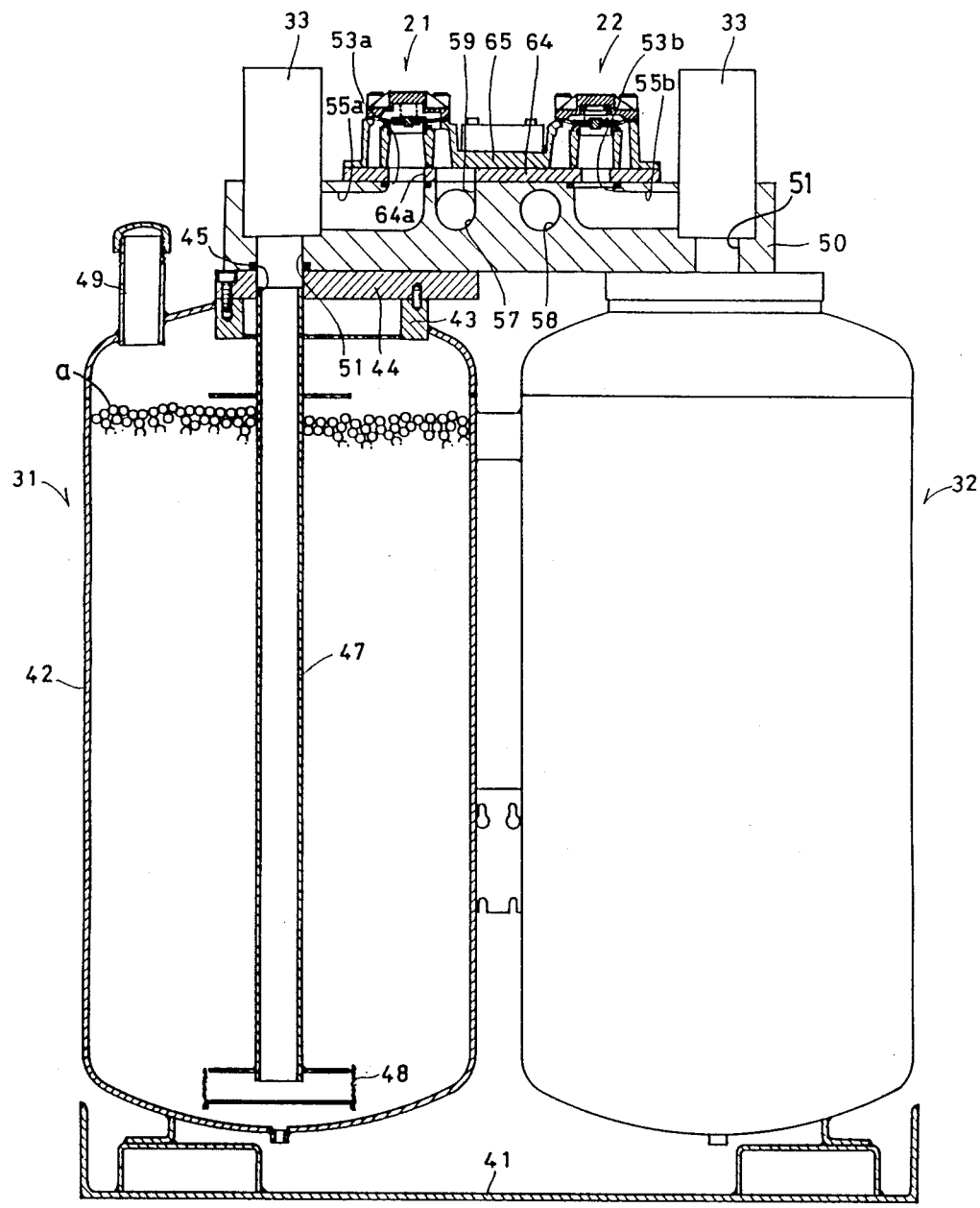
FIG. 6 is a sectional view taken along a line A—A in FIG. 5.
Figure 7:
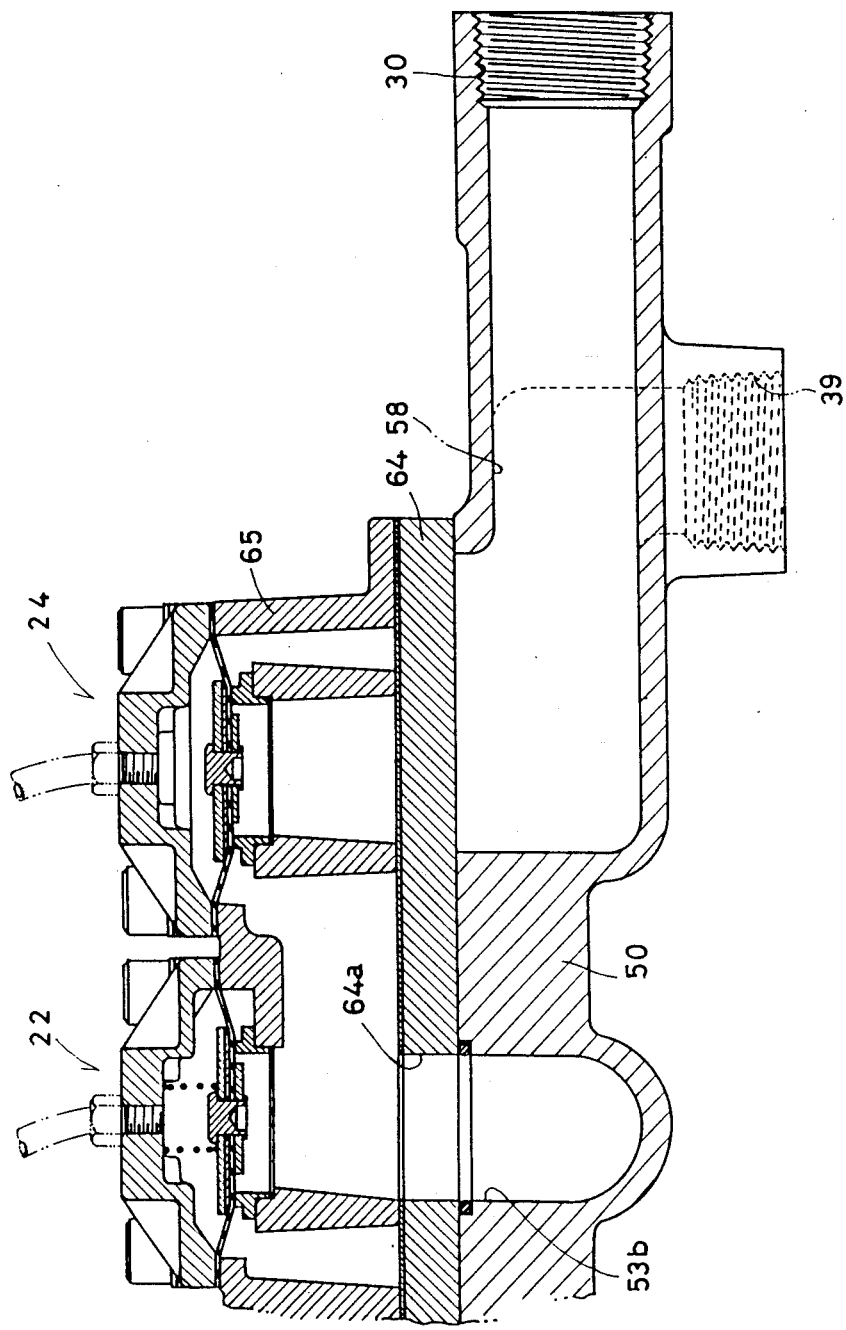
FIG. 7 is a sectional view taken along a line B—B in FIG. 5.

A construction of this embodiment will be described in reference with FIGS. 5 through 7. Said first and second separator vessels 31, 32 are uprightly mounted on a pedestal 41, side by side. The respective separator vessels 31, 32 each comprises a bottom-closed cylindrical vessel 42 formed at a top thereof with an open cylinder 43 provided at its top with a cover member 44. The cover member 44 is formed with a first opening 45 in alignment with the central axis of the cylindrical vessel 42 and an eccentric second opening 46. An inlet pipe 47 connected to said first opening 45 vertically extends toward the bottom of the cylindrical vessel 42 and its lower end is covered with wire gauze 48 while the second opening 46 directly communicates with the open cylinder 43. The cylindrical vessel 42 is packed with absorbent material a such as silica gel which has been charged through a charging cylinder 49 extending through the top wall of said cylindrical vessel 42. Unprocessed gaseous mixture fed through the first opening 45 is introduced into the inlet pipe 47 and, after having left the lower end thereof, upwardly flows through a mass of the adsorbent material a into the second opening 46. The processed gaseous mixture thus introduced into the second opening 46 downwardly flows through the mass of the adsorbent material a, then upwardly flows through the inlet pipe 47 into the first opening 45. In this way, the stream of gaseous mixture is circulated within the cylindrical vessel 42 in alternate directions. On top surfaces of the respective cover members 44, 44 formed with the openings 45, 46 of the pair of separator vessels 31, 32, there is mounted a horizontal first manifold plate 50 formed with said feed port 29 for unprocessed gaseous mixture and said discharge port 30 for dehumidified gaseous mixture. This first manifold plate 50 is formed in its bottom surface with openings 51, 52 communicating with the first and second openings 45, 46, respectively, of the respective separator vessels 31, 32 and in the top surface with openings 53a, 54a, 53b, 54b communicating with the respective openings 51, 52. Each of passages 55a, 56a, 55b, 56b defined between the respectively associated openings has said filter 33 disposed therein. The first manifold plate 50 is formed in its top surface additionally with openings 59, 60 communicating via passages 57, 58 with said feed port 29 and said discharge port 30, respectively, and an opening 61 communicating with the outlet 39 for the gaseous mixture which has regenerated the adsorbent material a. Said pair of regeneration promoting separator vessels 35, 36 which are essentially identical to the separator vessels 31, 32 in their construction but smaller than these vessels 31, 32 in their sizes are mounted to the bottom surface of the manifold plate 50 at the side thereof opposite to the side at which said feed port 29 and said discharge port 30 are formed. The first manifold plate 50 further includes openings 62a, 63a, 62b, 63b formed in its top surface so as to communicate with the openings of said regeneration promoting separator vessels 35, 36. An intermediate plate 64 having a plurality of through-holes 64a is mounted on the manifold plate 50 so that these through-holes 64a communicate with said plurality of openings formed in the top surface of the manifold plate 50. A second manifold plate 65 containing a plurality of passages formed therein so as to be connected to the openings in the top surface of the first manifold plate 50 is mounted on said intermediate plate 64. This second manifold plate 65 is provided with said eight switching valves 21 through 28 adapted to open and close the respective passages, the throttle valve 37 interposed between the pair of regeneration promoting separator vessels 35, 36 and said throttle valve 40 adapted to pressure-regulate the separator vessels 31, 32.

Figure 8:
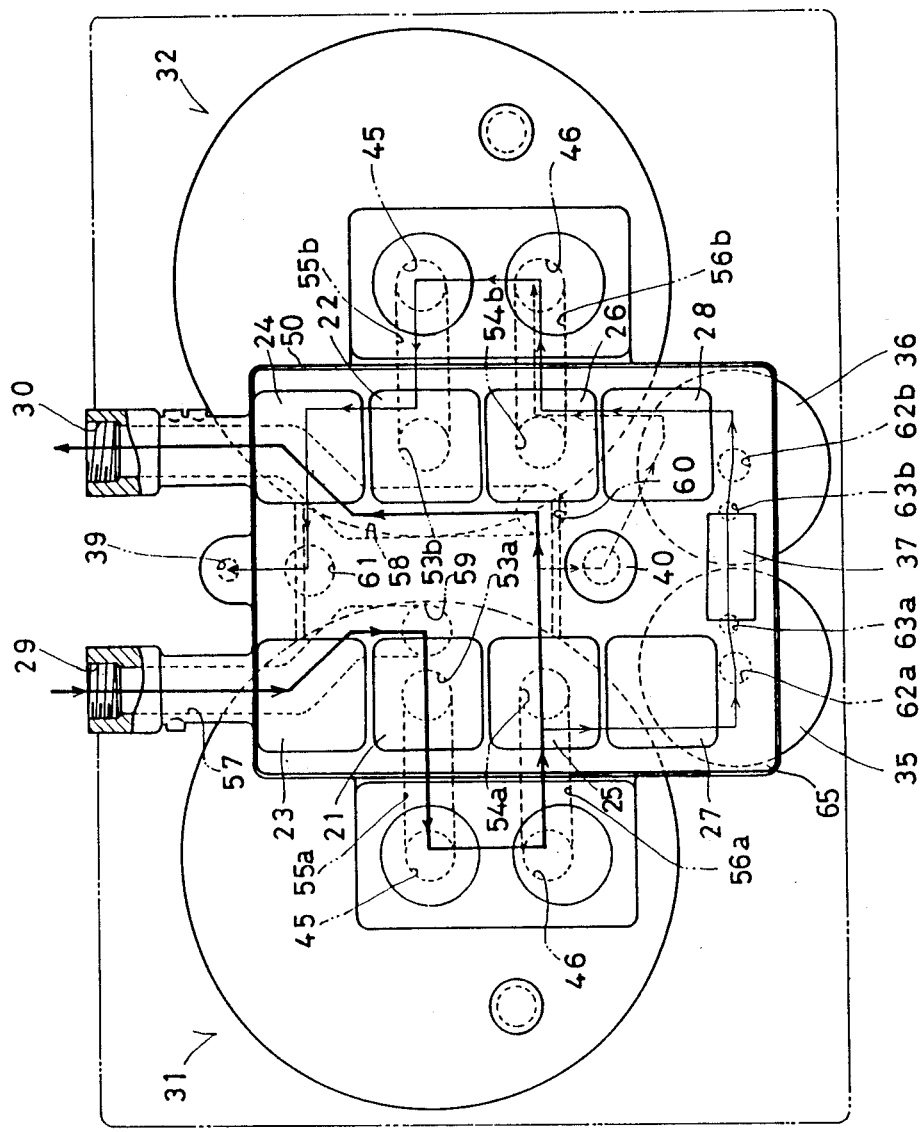
FIGS. 8 and 9 are plan views of the third embodiment, indicating gas flows with arrows.
Figure 9:
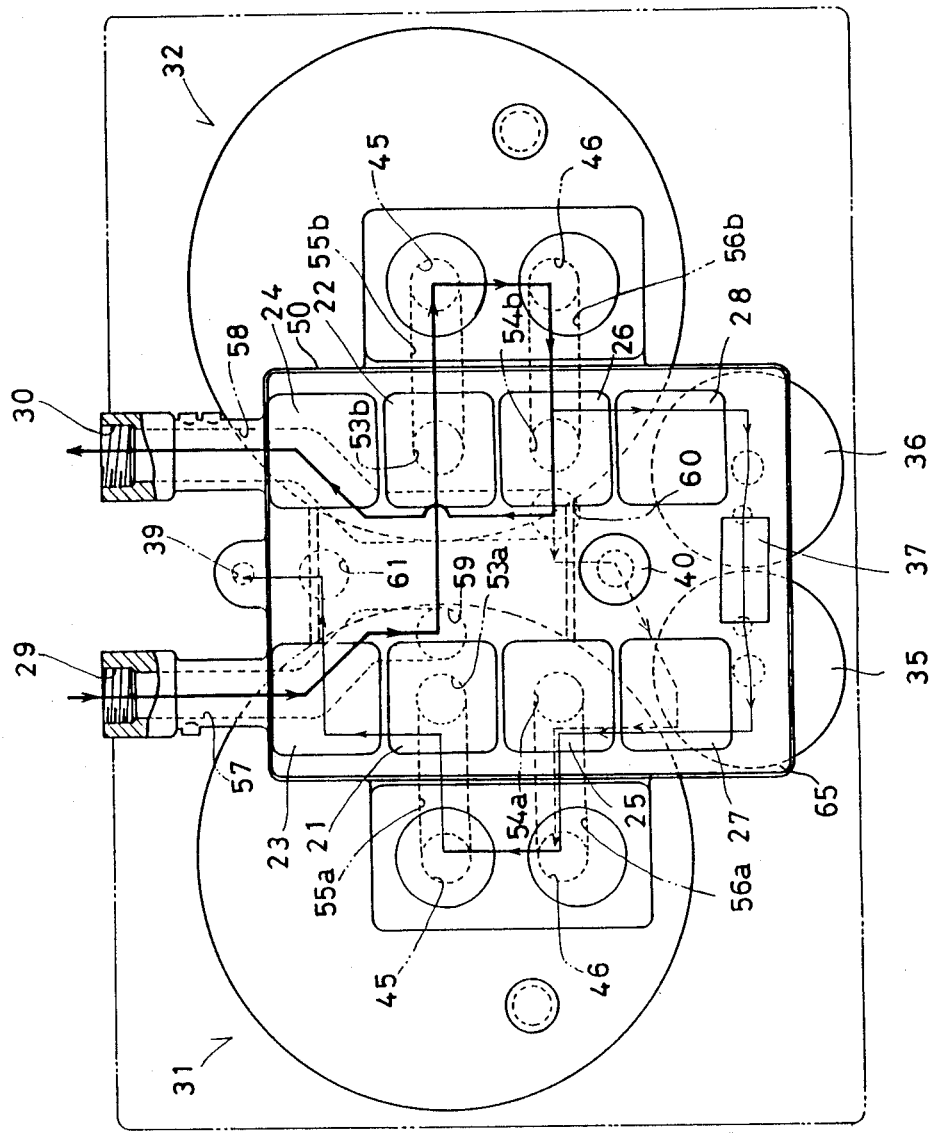

Now specific flow pattern of the gaseous mixture will be followed in reference with FIGS. 8 and 9. In the situation in which the first, fourth and fifth switching valves 21, 24, 25 are opened while the second, third and sixth switching valves 22, 23, 26 are closed and the seventh and eighth switching valves 27, 28 are closed, unprocessed gaseous mixture fed through the feed port 29, as indicated by a thick solid line, flows through the passage 57 immediately following said feed port 29 formed in the first manifold plate 50, then the opening 59 formed in the top surface thereof into the passage formed in the second manifold plate 65, passing through the valve port of the first switching valve 21 which is interposed therein thereafter flows again through the opening 53a in the first manifold plate 50 into the passage 55a formed in the first manifold plate 50. The unprocessed gaseous mixture is then introduced into the first opening 45 of the first separator vessel 31, circulated within this first separator vessel 31 and, after dehumidified within this, flows through the second opening 46 into the passage 56a in the first manifold plate 50. The dehumidified gaseous mixture is then introduced through the opening 54a formed in the top surface of the first manifold plate 50 into the passage in the second manifold plate 65, passing through the valve port of the fifth switching valve 25 interposed therein, then flows through the opening 60 in the first manifold plate 50 into the passage 58 formed in the first manifold plate 50 and is discharged through the discharge port 30. As indicated by a thin solid line in FIG. 8, a part of the processed gaseous mixture which has left the second opening 46 of the first separator vessel 31 flows through the passage in the second manifold plate 65, passing through the opening 62a formed in the first manifold plate 50 into the first regeneration promoting separator vessel 35 to be circulated therein, then flows again through the opening 63a into the passage in the second manifold plate 65, passing through the throttle valve 37 which is interposed in this passage, then flows through the opening 63b formed in the first manifold plate 50 into the second regeneration promoting separator vessel 36 to be circulated therein, thereafter flows through the opening 62b, the passage formed in the second manifold plate 65, the opening 54b formed in the first manifold plate 50, the passage 56b formed in the latter, then through the second opening 46 of the second separator vessel 32 into the latter to be circulated therein, thereafter flows through the first opening 45, the passage 55b in the first manifold plate 50, the opening 53b into the passage formed in the second manifold plate 65, passing through the valve port of the fourth switching valve 24 which is interposed therein, then flows through the opening 61 formed in the first manifold plate 50 into the passage immediately upstream of the outlet 39 and is finally exhausted through the outlet 39. When the fourth switching valve 24 is closed while the eighth switching valve 28 is opened, a part of the processed gaseous mixture flows, as indicated by broken lines in FIG. 8, a part of the processed gaseous mixture flows from the passage in the second manifold plate 65 which includes the fifth switching valve 25 disposed therein into the branch passage of this passage, passes through the throttle valve 40 interposed in this branch passage, then flows through the valve port of the eighth switching valve 28 into the second separator vessel 32 together with said regenerating gaseous mixture to increase a pressure within this second separator vessel 32.

Now the eighth switching valve 28 is closed while the conditions of the first through sixth switching valves 21 through 26 are reversed with respect to the previous conditions. In response to this, the unprocessed gaseous mixture fed through the feed port 29 flows, as indicated by a thick solid line in FIG. 9, through the passage 57 immediately following said feed port 29 formed in the first manifold plate 50, then the opening 59 formed in the top surface thereof into the passage formed in the second manifold plate 65 within which the second switching valve 22 is disposed, then flows through the valve port of the second switching valve 22, then the opening 53b formed in the first manifold plate 50 into the passage 55b extending therein, then flows through the first opening 45 of the second separator vessel 32 into the latter. The gaseous mixture which has been dehumidified by circulation within the second separator vessel 32 leaves this vessel through the second opening 46, flows through the passage 56b formed in the first manifold plate 50, then the opening 54b into the passage formed in the second manifold plate 65, passing through the valve port of the sixth switching valve 26, and, after has flown through the passage 58, is discharged through the discharge port 30 while, as indicated by a thin solid line in FIG. 9, a part of the processed gaseous mixture which has left the second opening 46 of the second separator vessel 32 flows through the passage in the second manifold plate 65 into the second regeneration promoting separator vessel 36 to be circulated within this, then flows again into the passage in the second manifold plate 65, passing through the throttle valve 37 disposed in this passage, then flows into the first regeneration promoting separator vessel 35 and, after circulation within this, flows through the second opening 46 of the first separator vessel 31 into the latter and, after circulation within this, flows through the first opening 45, the passage 55a formed in the first manifold plate 50, then the opening 53a into the passage in the second manifold plate 65, passing through the valve port of the third switching valve 23 disposed in this passage, then flows through the opening 61 formed in the first manifold plate 50 into the passage immediately upstream of the outlet 39 and is exhausted through said outlet 39. Then, in response to closure of the third switching valve 23 and opening of the seventh switching valve 27, as indicated by broken lines, a part of the processed gaseous mixture flows through the passage in the second manifold plate 65 containing the sixth switching valve 26 disposed in this passage into the branch passage connected to said passage, passing through the throttle valve 40 disposed in this branch passage, then the valve port of the seventh switching valve 27, and then flows together with said regenerating gaseous mixture into the first separator vessel 31 and thereby increases a pressure within this first separator vessel 31.

This embodiment is characterized in that the openings 45, 46 of the pair of separator vessels 31, 32 are formed in their top walls so as to achieve the cycles of separation as well as regeneration as gaseous mixture is circulated within the cylindrical vessel 42, the manifold plates 50, 65 mounted on said cylindrical vessel 42 are formed with the feed port 29 for unprocessed gaseous mixture and the discharge port 30 for processed mixture, and the plurality of switching valves 21 through 28 for switching between the separating cycle and the regenerating cycle are also disposed in these manifold plates 50, 65. Such features are advantageous in that no complicated piping is necessary, the apparatus as a whole can be constructed in a compact size and, accordingly, installed within a restricted space and maintenance and checking are facilitated, since the switching valves 21 through 28 are arranged together in the same place.

Figure 10:
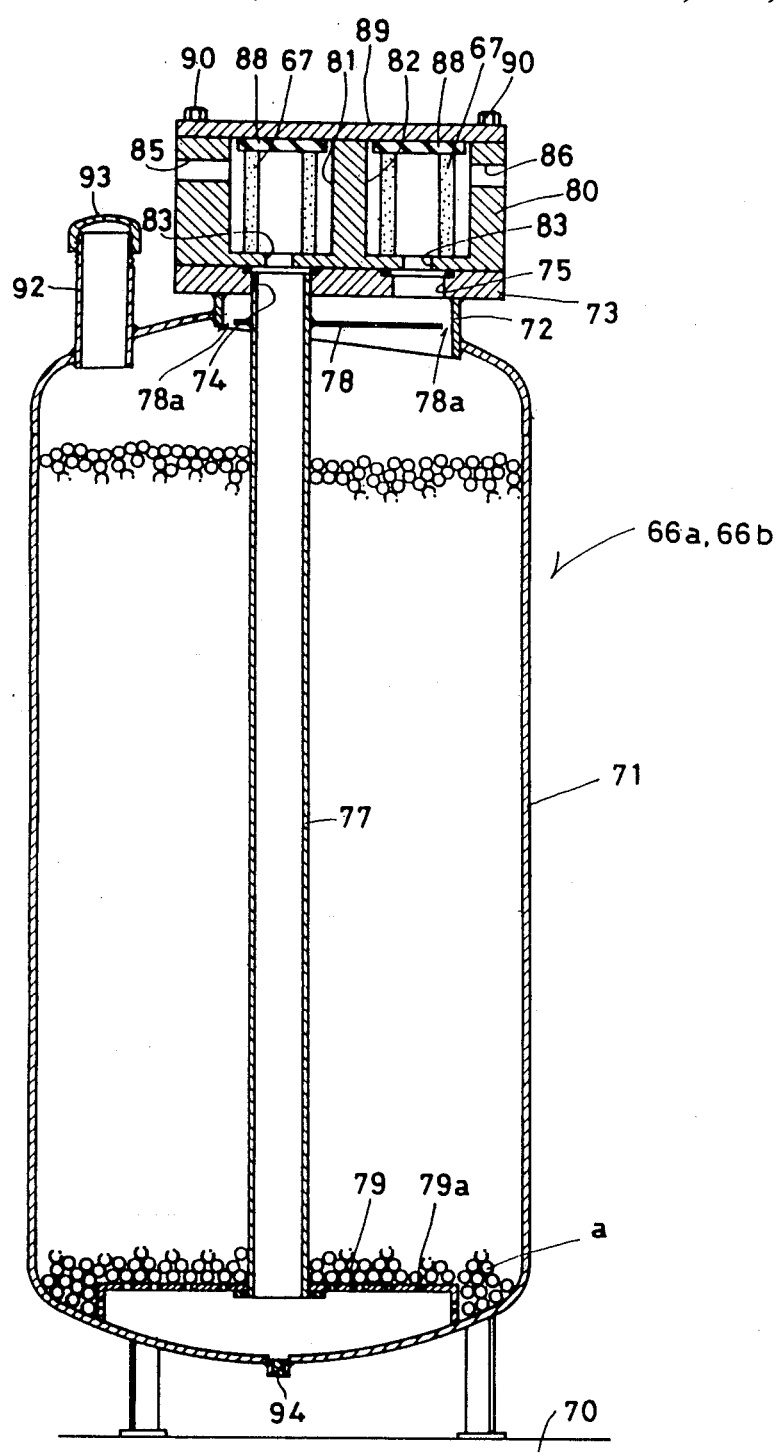
FIG. 10 is a longitudinal section showing another embodiment of main separator vessel used in the invention.

Another embodiment of the main separator vessel for use with the dehumidifier of the invention will be described in reference with FIG. 10.

In this embodiment, separator vessels 66a, 66b each comprises a bottom-closed cylindrical vessel 71 uprightly mounted on a pedestal 70 and its top partially defined by an open cylinder 72 eccentrically located. The open cylinder 72 of said cylindrical vessel 71 is provided on the top surface with a cover member 73 which is, in turn, formed with a first opening 74 in axes-coincident relationship with the cylindrical vessel 71 and a second opening 75 eccentric with respect to the central axis of said cylindrical vessel 71. An inlet pipe 77 including a deflector plate 78 fixed therearound is vertically inserted through said first opening 74 into the cylindrical vessel 71 so that the upper end of said inlet pipe 77 is connected to said first opening 74 and said deflector plate 78 is spaced from the inner periphery of said open cylinder 72. The lower end of the inlet pipe 77 extends through a perforated plate 79 disposed within the cylindrical vessel 71 so as to be spaced above the bottom of said vessel 71 and said lower end slightly project beyond the lower surface of said plate 79. The second opening 75 directly communicates with the interior of the open cylinder 72. A casing 80 defining a pair of top-opened compartments 81, 82 is fixedly mounted on the top of the cover member 73 so that the respective compartments 81, 82 individually communicate through associated through-holes 83, 83 formed in their bottoms with said first and second openings 74, 75, respectively. The compartment 81 communicating with the first opening 74 to which the inlet pipe 77 is connected is formed with a first inlet/outlet port 85 and the other compartment 82 is formed with a second inlet/outlet port 86. Filter 67 made of material such as sintered metal or compressed fibers in a cylindrical shape is disposed within each of the compartments 81, 82 so that the inner peripheral surface of said filter 67 communicates with the throughhole 83. A packing 88 is placed on the top surface of said filter 67 while a cover plate 89 is put on the top surface of the casing 80, and such assembly may be fastened by bolts 90 to effectively close the top sides of the respective compartments 81, 82. Said adsorbent material a such as silica gel is charged through a charging cylinder 92 formed in the top wall of the cylindrical vessel 71 so that the volume of the vessel defined between the perforated plate 79 disposed adjacent and above the bottom of the vessel 71 and the upper end of said vessel 71 is filled with said adsorbent material a.

With this embodiment of the separator vessel 66 constructed as mentioned above, first during the separating cycle for adsorption of water vapor contained in unprocessed gaseous mixture, the unprocessed gaseous mixture at a high pressure fed through the first inlet/outlet port 85 passes through the filter 67 into its inner space, flowing through the inlet pipe 77 connected to the first opening 74 into a space defined between the lower surface of the perforated plate 79 and the bottom of the cylindrical vessel, then upwardly flows through the perforations 79a, then a mass of the adsorbent packing material a in the cylindrical vessel 71 and, as a result, water vapor contained in the unprocessed gaseous mixture is adsorbed by the adsorbent material a. The gaseous mixture thus dehumidified is introduced through a gap 78a between the inner peripheral surface of the open cylinder 72 and the deflector plate 78 into the second opening 75, flows through the filter 67 into a space outside thereof, and then is discharged through the second inlet/outlet port 86. Second during the regenerating cycle for removal of the moisture from the adsorbent material a, a part of the dehumidified gaseous mixture which has been pressure-reduced and further dried is fed through the second inlet/outlet port 86, then flows through the filter 67, the second opening 75 and the gap 78a between the inner peripheral wall of the open cylinder 72 and the deflector plate 78, then flows downwardly through the mass of the adsorbent material a and further through the perforations 79a of the perforated plate 79 disposed adjacent and above the bottom of the cylindrical vessel and, in consequence, the moisture previously adsorbed by the adsorbent material a is removed therefrom to achieve the desired regeneration of the adsorbent material a. The gaseous mixture thus having regenerated the adsorbent material a now flows upwardly through the inlet pipe 77 and after having passed through the filter 67, is discharged through the first inlet/outlet port 85. During such circulation, the gaseous mixture passes through the filters 67 outside the first and second openings 74, 75, so that powdery dust of the adsorbent material a is prevented from flowing out of said first and second openings 74, 75.

When the filters 67 become clogged, the cover member 89 may be removed from the casing 80 by loosening the bolts 90 to exchange said filters 67 with news ones. During this operation, the cylindrical vessel 71 may remain fixed on the pedestal 70, so there is no possibility that the adsorbent material a be scattered out of the cylindrical vessel 71. Furthermore, running of the apparatus can be restarted immediately after exchange of the filters 67, since a concentration distribution of water vapor having been adsorbed by the adsorbent material a is maintained during said operation of the filter exchange. For exchange of the adsorbent material a, a cap 93 of the charging cylinder 92 mounted in the cylindrical vessel 71 may be removed, then the adsorbent material a may be drawn out by a suitable vacuum suction device from the vessel and fresh adsorbent material a may be charged through the charging cylinder 92 into the vessel. A quantity of water accumulated within the cylindrical vessel 71 is drained through a drain port 94 formed in the bottom wall of the cylindrical vessel 71.

We claim:

1. Apparatus for separating gaseous mixtures comprising a pair of main conduits, each having an associated main separator vessel packed with adsorbent or absorbent material functioning as separating material, the main separator vessels being arranged in parallel with each other with inlet sides of the respective main conduits being connected to a common feed port while outlet sides of the respective main conduits are connected to a common discharge port, said main conduits being interconnected on their discharge sides by a bypass conduit including a stationary or variable throttle means, wherein pressurized unprocessed gaseous mixture consisting of two or more different components fed through the feed port is introduced alternately into the respective main conduits at predetermined time intervals by operating a plurality of switching valves provided in the respective main conduits, there being a separating cycle during which the unprocessed gaseous mixture is fed into one of the main separator vessels to remove one or more components thereof to produce a processed gaseous mixture which is discharged through the discharge port, there further being a regenerating cycle during which the processed gaseous mixture is partially introduced into the bypass conduit, then pressure-reduced through the throttle means interposed in this bypass conduit and the processed gaseous mixture is concentration-reduced and introduced into the other main separator vessel so as to remove the quantity of components previously adsorbed or absorbed by the separating material present in the separator vessel and thereby to regenerate the separating material, wherein the separating and regenerating cycles may be alternately repeated, the apparatus further comprising regeneration promoting separator vessels in the bypass conduit up- and downstream of the throttle means, respectively, the regeneration promoting separator vessels further packed with adsorbent or absorbent material thereby reducing the concentration of the components still remaining in the processed gaseous mixture flowing through the bypass conduit.

2. Apparatus for separating gaseous mixtures as recited in claim 1, wherein said pair of main separator vessels are uprightly installed on the pedestal side by side, a pair of openings serving as inlet/outlet ports for the respective main separator vessels are formed side by side in their top surfaces so that said unprocessed or processed gaseous mixture can be circulated within the respective separator vessels, a manifold plate having said feed port and said discharge port formed therein is mounted on the top surfaces of said main separator vessels substantially in horizontal posture, said respective openings of said respective main separator vessels are connected to the openings formed in the bottom surface of said manifold plate and said manifold plate is provided with said plurality of switching valves for switching a plurality of passages formed in said manifold plate, said unprocessed or processed gaseous mixture is selectively introduced into said plurality of passages formed in said manifold plate by operating said plurality of switching valves to effect said separating cycle and said regenerating cycle, and said pair of regeneration promoting separator vessels are mounted on the underside of said manifold plate and connected to said passages.

3. Apparatus for separating gaseous mixtures as recited in claim 1, wherein said main separator vessels each comprises a cylindrical vessel packed with said separating material and provided in its top wall with a pair of openings serving as the inlet and the outlet, side by side, and a casing connected to the outsides of said respective openings and containing therein associated filters.

* * * * *